United States Patent
Yang et al.

(10) Patent No.: US 7,916,944 B2
(45) Date of Patent: Mar. 29, 2011

(54) SYSTEM AND METHOD FOR FEATURE LEVEL FOREGROUND SEGMENTATION

(75) Inventors: Tao Yang, ShaanXi (CN); Francine Chen, Menlo Park, CA (US); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1093 days.

(21) Appl. No.: 11/669,879

(22) Filed: Jan. 31, 2007

(65) Prior Publication Data

US 2008/0181499 A1  Jul. 31, 2008

(51) Int. Cl.
G06K 9/34  (2006.01)
(52) U.S. Cl. ........................................ 382/173; 348/143
(58) Field of Classification Search ................. 382/100, 382/103, 107, 173; 348/143–160
See application file for complete search history.

(56) References Cited

U.S. PATENT DOCUMENTS

| | | | | |
|---|---|---|---|---|
| 6,819,796 B2* | 11/2004 | Hong et al. | ................... | 382/173 |
| 7,106,908 B2* | 9/2006 | Ridge | ........................... | 382/239 |
| 7,177,483 B2* | 2/2007 | Saund | ........................... | 382/282 |
| 7,277,580 B2* | 10/2007 | Xu | ................................ | 382/173 |
| 7,336,296 B2* | 2/2008 | Brown et al. | ................. | 348/139 |
| 7,574,043 B2* | 8/2009 | Porikli | ........................... | 382/173 |
| 7,639,878 B2* | 12/2009 | Ibrahim et al. | ................ | 382/190 |
| 2003/0108238 A1* | 6/2003 | Xu | ................................ | 382/173 |
| 2003/0174896 A1* | 9/2003 | Ridge | ........................... | 382/239 |
| 2004/0042680 A1* | 3/2004 | Saund | ........................... | 382/274 |
| 2004/0151374 A1* | 8/2004 | Lipton et al. | ................. | 382/181 |
| 2005/0163378 A1* | 7/2005 | Chen | ............................ | 382/190 |
| 2005/0286764 A1* | 12/2005 | Mittal et al. | .................. | 382/181 |
| 2006/0045357 A1* | 3/2006 | Schwartz et al. | ............ | 382/232 |
| 2007/0036432 A1* | 2/2007 | Xu et al. | ....................... | 382/173 |
| 2008/0181499 A1* | 7/2008 | Yang et al. | .................... | 382/174 |
| 2009/0010546 A1* | 1/2009 | Rossato et al. | ............... | 382/199 |

OTHER PUBLICATIONS

Background Subtraction and Shadow Detection in Grayscale Video Sequences; Proceedings of the XVIII Brazilian Symposium on Computer Graphics and Image Processing 2005 Julio Cezar Silveira Jacques Jr. University of Vale do Rio dos Sinos, Claudio Rosito Jung, Soraia Raupp Musse.*

"Tracking and Object Classification for Automated Surveillance" Proceedings of the 7th European Conference on Computer Vision. 2002.*

Grest Frahm and Kock "A Color Similarity Measure for Robust Shadow Removal in Real-Time Vision" Modeling and Visualization 2003.*

Collins R., et al., "*A system for video surveillance and monitoring,*" VSAM final report. Carnegie Mellon University, Technical Report: CMU-RI-TR-00-12, 2000.

(Continued)

*Primary Examiner* — Jingge Wu
*Assistant Examiner* — Sean Motsinger
(74) *Attorney, Agent, or Firm* — Sughrue Mion, PLLC

(57) ABSTRACT

Foreground segmentation in real world dynamic scenes, including under various lighting and shadow conditions, is disclosed. It may be used with one or multiple cameras for various automated tasks, such as classification of moving object, tracking moving objects, and event detection in various indoor or outdoor environments. Pixel to pixel subtraction is performed on each frame, followed by a feature-level based foreground segmentation to properly validate the foreground pixels. In this step, for each pixel in the image, a neighborhood of pixels is selected, and the aggregate change in the neighborhood image is used to classify foreground and background pixels. Normalized cross correlation is then applied to the neighborhood of each pixel that was confirmed to be foreground pixel.

20 Claims, 3 Drawing Sheets

OTHER PUBLICATIONS

C. Stauffer, et al., "*Learning Patterns of Activity Using Real-Time Tracking*," IEEE Transactions on Pattern Analysis and Machine Intelligence, vol. 22, Issue 8, Aug. 2000, 747-757.

A. Elgammal, et al., "*Background and Foreground Modeling using Non-parametric Kernel Density Estimation for Video Surveillance[J]*," Proceedings of the IEEE, 2002, 90(7):1151-1163.

Y. Tian, et al., "*Robust and Efficient Foreground Analysis for Real-time Video Surveillance*," IEEE Computer Vision and Pattern Recognition, San Diego, Jun. 2005.

M. Harville, "*A Framework for High-Level Feedback to Adaptive, Per-Pixel, Mixture-of-Gaussian Background Models*," ECCV 2002: 543-560.

D. Zhang, et al. "*Segmentation of moving objects in image sequence: A review, Circuits, Systems, and Signal Processing*," vol. 20, No. 2 2001.3.

Philippe Noriega and Olivier Bernier, "*Real Time Illumination Invariant Background Subtraction Using Local Kernel Histograms*," BMVC 2006.

T. Parag, et al.; "*A Framework for Feature Selection for Background Subtraction*," Proceedings of the 2006 IEEE Computer Society Conference on Computer Vision and Pattern Recognition—vol. 2 table of contents, pp. 1916-1923.

J.P. Lewis, "*Fast normalized cross-correlation*"; In Vision Interface, 1995.

* cited by examiner

SYSTEM AND METHOD FOR FEATURE LEVEL FOREGROUND SEGMENTATION

BACKGROUND

1. Field of the Invention

The subject invention relates to video imaging and, more specifically, to automatic detection and segmentation of foreground in video streams.

2. Description of the Related Art

Automatic understanding of events happening at a site is the ultimate goal for intelligent visual surveillance systems. Higher-level understanding of events requires that certain lower level computer vision tasks be performed. These may include identification and classification of moving objects, tracking of moving objects, such as people, and understanding of people interaction. To achieve many of these tasks, it is necessary to develop a fast and reliable moving object segmentation method in dynamic video scenes.

Background subtraction is a conventional and effective approach to detect moving objects. Many researchers have proposed methods to address issues regarding the background subtraction. One prior art method proposes a three-frame differencing operation to determine regions of legitimate motion, followed by adaptive background subtraction to extract the moving region. According to another prior art method, each pixel is modeled as a mixture of Gaussians, and an on-line approximation is used to update the model. Yet another prior art method uses nonparametric kernel density estimation to model the intensity distribution of each pixel, and another calculates the normalized cross-correlation on the foreground region for shadow removal, and uses a threshold to avoid detecting shadow in dark areas. The last method is based on an assumption that the image produced by the pixel level background subtraction contains all possible foreground regions; however, this assumption isn't valid when the pixel level background subtraction fails due to, e.g., similar color between the foreground and background. Moreover, the threshold in the last method is sensitive to various scene changes. Consequently, misclassified pixels are ignored and are not used in the normalized cross correlation calculation. Further information about these methods can be found in:

[1] R. Collins, et al., A system for video surveillance and monitoring: VSAM final report, Carnegie Mellon University, Technical Report: CMU-RI-TR-00-12, 2000.

[2] C. Stauffer, W. Eric L. Grimson, Learning Patterns of Activity Using Real-Time Tracking, IEEE Transactions on Pattern Analysis and Machine Intelligence, Volume 22, Issue 8, August 2000, 747~757.

[3] A. Elgammal, et al., Background and Foreground Modeling using Non-parametric Kernel Density Estimation for Video Surveillance, Proceedings of the IEEE, 2002, 90(7): 1151~1163.

[4] Ying-li Tian, Max Lu, and Arun Hampapur, Robust and Efficient Foreground Analysis for Real-time Video Surveillance, IEEE Computer Vision and Pattern Recognition, San Diego, June, 2005.

[5] Michael Harville, A Framework for High-Level Feedback to Adaptive, Per-Pixel, Mixture-of-Gaussian Background Models, ECCV 2002: 543-560.

[6] Dengsheng Zhang, Guojun Lu, Segmentation of moving objects in image sequence: A review, Circuits, Systems, and Signal Processing, Volume 20, Number 2 2001.3.

[7] Philippe Noriega, Olivier Bernier, Real Time Illumination Invariant Background Subtraction Using Local Kernel Histograms, BMVC 2006.

[8] Toufiq Parag, Ahmed Elgammal, and Anurag Mittal; A Framework for Feature Selection for Background Subtraction, Proceedings of the 2006 IEEE Computer Society Conference on Computer Vision and Pattern Recognition—Volume 2 table of contents, Pages: 1916-1923.

[9] J. P. Lewis, Fast normalized cross-correlation; *In Vision Interface*, 1995.

The entire disclosure of all of which is incorporated herein by reference.

The prior art methods discussed above are all based on pixel level subtraction. A natural downside is that those methods only compare the difference of each pixel during foreground subtraction, so as to ignore the local region information. As a result, the methods often fail in situations such as:

(1) Similar color between input image and background;
(2) Shadows;
(3) Sudden illumination changes;
(4) Random motion (e.g., shaking leaves in the wind).

That is, even when region information was used in the comparison, the choice of region for the comparison was based on the pixel level comparison. Consequently, the regional information was not used for any of the pixels that were erroneously classified as equivalent to the background.

Accordingly, there is a need in the art for a more reliable and robust method for accurately deciphering foreground pixels in an input video stream.

SUMMARY

The subject invention provides fast and robust foreground segmentation in real world dynamic scenes, including under various lighting and shadow conditions. Various embodiments of the invention may be used with one or multiple cameras for various automated tasks, such as classification of moving objects, tracking of moving objects (including people), and event detection in various indoor or outdoor environments.

According to embodiments of the invention, after the pixel to pixel subtraction, a novel feature-level based foreground segmentation method is used to properly validate the foreground pixels. In this step, for each pixel in the image, a neighborhood of pixels is selected, and the aggregate change in the neighborhood image is used to classify foreground and background pixels. In one embodiment, the aggregate change is the number of pixels that were classified as foreground during the pixel-to-pixel subtraction step. According to another embodiment, the aggregate change is the percentage of pixels that were classified as foreground during the pixel-to-pixel subtraction step. According to yet another embodiment, the aggregate change is the difference in total intensity of the neighborhood of pixels as compared with the total intensity of the corresponding background pixels. Once the foreground segmentation has been completed, normalized cross correlation is applied to the validated foreground pixels and the corresponding background pixels to identify confirmed foreground pixels.

According to a feature of the invention, a method for performing feature level segmentation is provided, the method comprising:

a. selecting a background image;
b. selecting an input image;
c. for each input pixel of the input image:
  c.i. classifying the pixel as a candidate foreground pixel or candidate background pixel;
  c.ii. selecting a neighborhood image about the pixel;
  c.iii. determining the aggregate change in the neighborhood image;

c.iv. depending upon the aggregate change, reclassifying the pixel as a foreground or a background pixel;

d. outputting an indication of all of the image pixels reclassified as foreground pixels.

The method may further comprise the steps:

e. for each pixel reclassified as foreground pixel:

e.i. computing a difference of the neighborhood image of the reclassified foreground pixel and the corresponding background neighborhood image; and, e.ii. when the difference passes a set threshold, outputting an indication that the pixel is a confirmed foreground pixel.

The method may further comprise the step:

e.iii. generating a feature extracted image from all of the confirmed foreground pixels.

The method may further comprise the step:

e.iii. generating a feature extracted image from all of the input pixels that were reclassified as foreground pixels.

In the method the determining the aggregate change in step c.iii. may comprise counting the total number of pixels in the neighborhood image that were classified as candidate foreground pixels in step c.i. The determining the aggregate change in step c.iii. may further comprise comparing the total number to a threshold. The determining the aggregate change in step c.iii. may also comprise calculating the percentage of pixels in the neighborhood image that were classified as candidate foreground pixels in step c.i. The determining the aggregate change in step c.iii. may further comprise comparing the percentage to a threshold. The determining the aggregate change in step c.iii. may alternatively comprise calculating the total intensity of pixels that were classified as candidate foreground pixels in step c.i. The determining the aggregate change in step c.iii. may further comprise subtracting the total intensity from a total background intensity of corresponding background neighborhood pixels to generate intensity difference, and comparing an absolute of the intensity difference to a threshold. The computing a difference of step e.i. may comprise computing normalized cross correlation for the neighborhood image and the background neighborhood image. The cross-correlation may be computed using an integral image. The computing a difference of step e.i. may comprise constructing neighborhood image intensity matrix and background neighborhood image intensity matrix and performing a dot product of the neighborhood image intensity matrix and the background neighborhood image intensity matrix. The computing a difference of step e.i. may comprise constructing neighborhood image gradient distribution and background neighborhood gradient distribution and computing the similarities of the neighborhood image gradient distribution and the background neighborhood image gradient distribution. Step c.i. may comprise comparing the input pixel to corresponding background pixel in the background image to classify the pixel as a candidate foreground pixel or candidate background pixel. Step c.ii. may comprise selecting a plurality of pixels about the pixel to define the neighborhood. The method may further comprise step b.i. of updating the background image using the input image. Step c.iv. may comprise comparing the aggregate change to a threshold.

According to other aspects of the invention, a system for performing feature level segmentation is provided, comprising:

a video storage module receiving at least one stream of video from at least one video camera;

a feature segmented storage module storing feature segmented images;

a feature extraction module, said feature extraction module comprising:

a background image storage module storing a background image;

a pixel level subtraction module receiving images of the video stream and for each image classifying each pixel of the image as background or foreground pixel;

a foreground density estimation module receiving the background and foreground pixels from the pixel level subtraction module and for each pixel selecting a plurality of neighboring pixels to define a neighborhood image and calculating a total change of the neighborhood, based upon the total change said foreground density estimation module reclassifies each pixel as reclassified-background or reclassified-foreground pixel;

a feature extraction module receiving the reclassified-foreground pixels and generating feature segmented images and output the feature segmented images to be stored in the feature extraction module.

The feature extraction module may comprise a feature level subtraction module receiving the reclassified-foreground pixels and performing a normalized cross correlation on a neighborhood of each the reclassified-foreground pixel to select pixels for generating the feature extracted images. The system may further comprise pixel level background modeling module receiving the video stream and updating the background image.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

Figure 1:
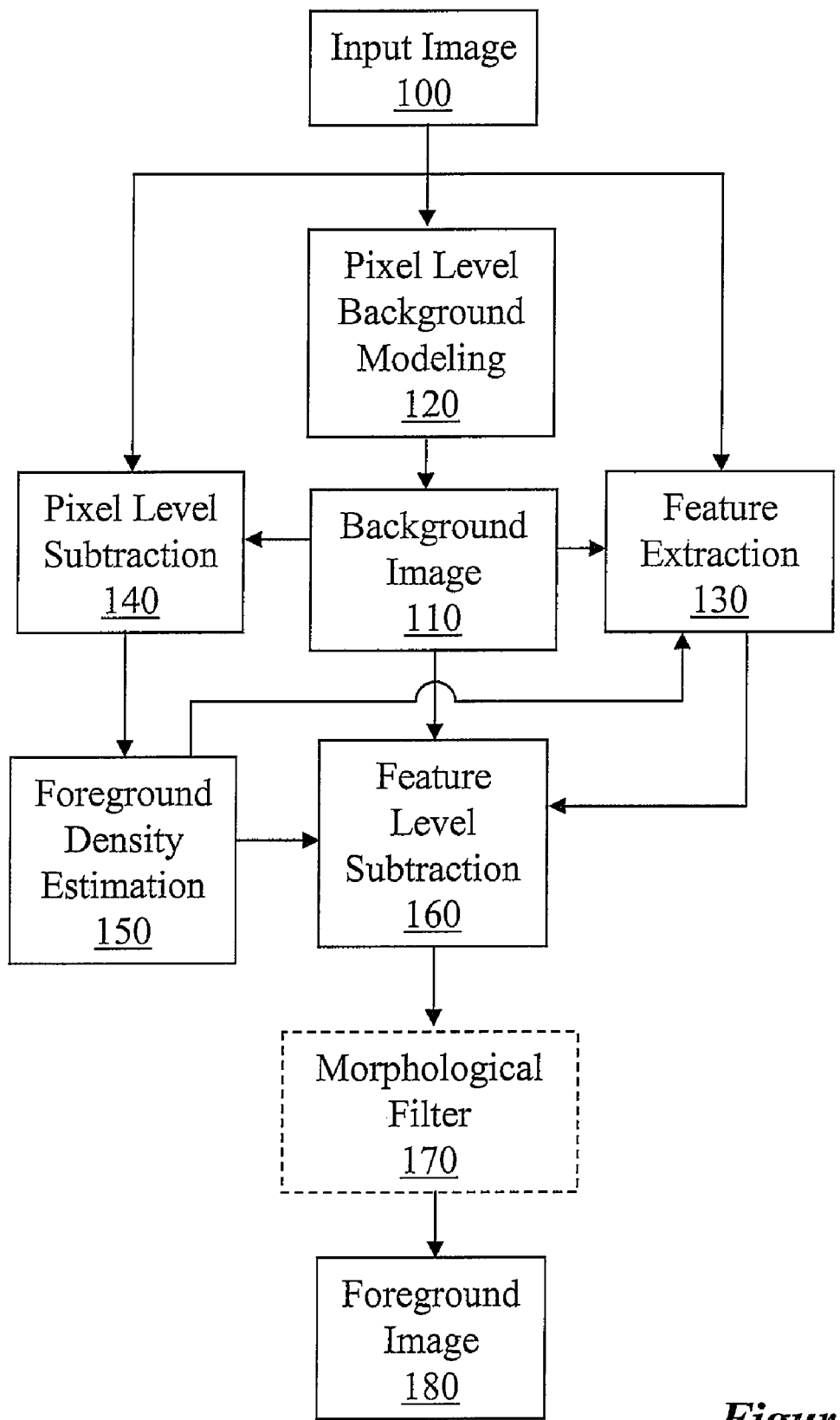
FIG. 1 illustrates a framework of feature level foreground segmentation method according to an embodiment of the invention.
Figures 2A, 2B, 2C, 2D, 2E:
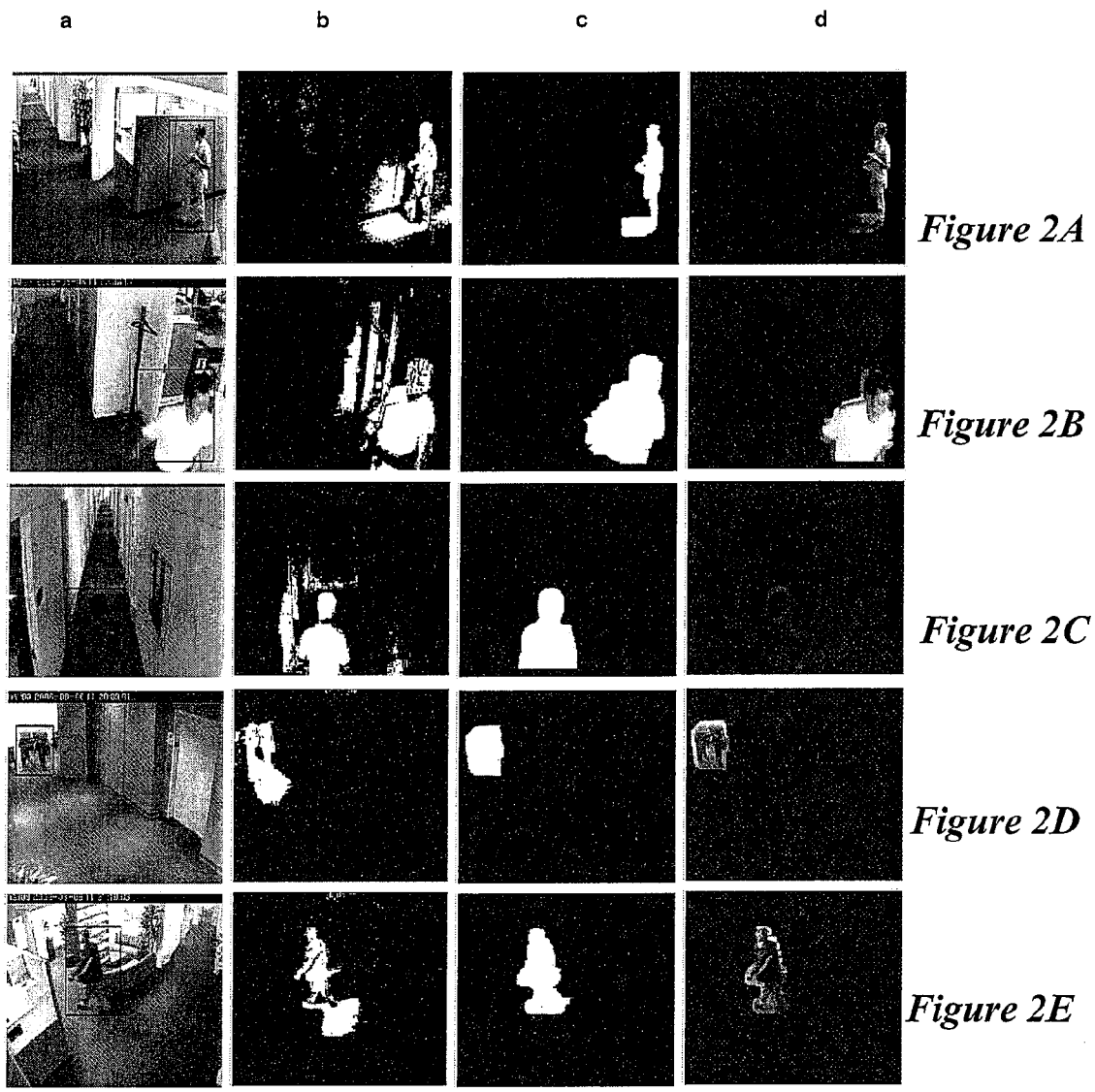
FIGS. 2(A)-(E) illustrate some examples of using the method according to the embodiment described for foreground segmentation under various illumination conditions, in comparison with results of the prior art.

The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

DETAILED DESCRIPTION

Various embodiments of the subject invention present novel methods for foreground segmentation in complex real world scenes. A unique characteristic of the method is its ability to achieve precise segmentation results even under challenging indoor environments with cast shadows and changing illumination. According to exemplary embodiments of the invention, instead of classifying foreground pixels based only on the pixel level subtraction, a feature level subtraction is performed so as to take into account the neighborhood of the pixel. That is, according to an embodiment of the invention, a feature level subtraction module uses local region information for a more robust foreground subtraction. For each pixel of the image, a neighborhood about that pixel is selected and the aggregate change of the neighborhood pixels is determined. The aggregate change indicates the number of pixels in the neighborhood that were classified as foreground pixels during the pixel level subtraction. When the aggregate change is above a set threshold, the pixel is selected as foreground pixel. Then, for each foreground pixel, the neighborhood and the corresponding background neighborhood are correlated to provide the feature segmentation. This can be done for all foreground pixels, or for only selected pixels. For example, in certain applications one may not need the resolution of each pixel, but rather select every n-number of foreground pixels to calculate the correlation.

Thus, according to embodiments of the invention, general metrics that can measure the similarity between two vectors or arrays can be used. That is, the selected pixels of the foreground and background neighborhoods can be represented by vectors or matrices, and then measures are used to determine the similarities of the vectors or matrices. The representation can be, for example, using intensity of each pixel, using gradient, etc. Finding similarities can be performed by, for example, computing the cosine similarity or normalized cross correlation, etc.

According to an embodiment of the invention, the Gaussian mixture model is utilized for pixel level background modeling. This can be done using similar methods as described in the work of Stauffer [2] and Tian et al. [4] cited above, although any method for pixel level background subtraction may be used. In this example we only compute the Gaussian model in grayscale images. For each pixel X at time t, the probability of the pixel can be written as (1):

$$P(X_t) = \sum_{i=1}^{K} \varpi_{i,t} * \eta\left(X_t, \mu_{i,t}, \sum_{i,t}\right) \quad (1)$$

where $$\eta\left(X_t, \mu_{i,t}, \sum_{i,t}\right) = \frac{1}{(2\pi)^{\frac{n}{2}}|\sum_{i,t}|^{1/2}} e^{-\frac{1}{2}(X_t-\mu_{i,t})^T \sum_{i,t}^{-1}(X_t-\mu_{i,t})}, \quad (2)$$

$i = 1, \ldots, K$
and $$\varpi_{i,t} = (1-\alpha)\varpi_{it-1} + \alpha(M_{k,t}) \quad (3)$$

where K is the number of mixture of Gaussians, $\mu$ is the mean, variances $\Sigma_{i,t}=\sigma_k^2 I$, $\alpha$ is the learning rate, $M_{k,t}$ is 1 for the model which matched and 0 for the remaining models. During the online detection, the Gaussians are ordered by the value of $\bar{\varpi}/\alpha$. The first N distributions are selected for pixel level background subtraction, $$N = \underset{n}{\operatorname{argmax}}\left(\sum_{k=1}^{n} \varpi_k > T\right) \quad (4)$$

where T is the portion of the background model. The mixture of Gaussian method is robust to slow illumination changes, and random motion in cluttered environments, but as in other pixel level based methods, it only considers the difference of each pixel in foreground subtraction, so as to ignore the local region information.

In the prior art, it was suggested to next compute the cross-correlation in a neighborhood around each foreground pixel in the image and based on whether the cross-correlation is similar enough, classify the foreground pixel as shadow or true foreground. This procedure will not create new foreground pixels; but rather the initial set of foreground pixels may be reduced by labeling some of them as shadow. Notably, the decision of which pixels to choose for the cross correlation calculation was based on the pixel level identification of the foreground pixels. Thus, erroneous pixel level identification will lead to missing foreground pixels because the cross correlation calculation was not performed on all of the relevant pixels.

A feature of the embodiment according to this invention is that the pixels selected for cross correlation calculation are determined by taking into account the neighborhood of the pixel in question. That is, we first compute a more lenient foreground mask, essentially "smoothing" the foreground mask, and then use the cross-correlation to compute a revised foreground estimate for selected pixels in the new foreground mask. This procedure tends to produce more foreground pixels than there were in the original foreground mask in cases when there is moving background or the foreground color is similar to the background color. This is performed as follows. First define:

$R_{x,y}^{C_i} = \{x,y,w,h\}$ is the position and size of local rectangle region of pixel (x,y) at camera $C_i$.

Next identify a subset of pixels to use in the cross-correlation computation. This is based on the foreground classification in a local neighborhood of the pixel as follows:

given $F_p(t)$, the output foreground image of pixel level background subtraction at time t;

compute $D_{x,y}^{C_i}(t)$, the foreground ratio inside the region $R_{x,y}^{C_i}$ located at pixel (x,y) at time t, as:

$$D_{x,y}^{C_i}(t) = \frac{1}{w \cdot h} \sum_{(x,y) \in R_{x,y}^{C_i}} F_{x,y}^p(t) \quad (5)$$

select pixels where the foreground ratio $D_{x,y}^{C_i}(t)$ is higher than a ratio $T_P$ as the pixels for which the normalized cross-correlation will be computed.

This subset of pixels can be thought of as a smoothed version of the original foreground mask, and are "candidate foreground" pixels. During the normalized cross-correlation computation, we determine a subset of mixture component(s) to use:

determine P, the component in the Gaussian mixture model with the greatest weight:

$$P = \underset{k}{\operatorname{argmax}}(\varpi_k) \quad (6)$$

P is usually a single component, but more than one component may be used.

identify B(t), the mean value of the Gaussian distribution P in the Mixture of Gaussians Model at time t. If more than one mixture component is identified, then B(t) contains the corresponding number of Gaussian means.

1. One Dimension Representation and Metric

A vector, such as a histogram-based descriptor, can be used to represent the pixels in a block of an image. Let's denote the one dimension histogram of the region on input image and background image as vector I and B respectively. Various descriptors can be used to compute the histogram. For instance, the color histogram or the gradient orientation histogram can be computed. A gradient orientation histogram is a representation of an image derived by counting the 'gradient orientation' of each pixel.

To compare the similarity $M_t(x,y)$ of two vectors of length m centered at (x,y), the standard normalized cross correlation (7) is an example of a metric that can be used.

$$M_t(x, y) = \frac{\sum_{k=1}^{m} I_t(k) \cdot B_t(k) - \frac{1}{m} \sum_{k=1}^{m} I_t(k) \cdot \sum_{k=1}^{m} B_t(k)}{\sqrt{\left(\sum_{k=1}^{m} I_t^2(k) - \frac{1}{m}\left[\sum_{k=1}^{m} I_t(k)\right]^2\right)\left(\sum_{k=1}^{m} B_t^2(k) - \frac{1}{m}\left[\sum_{k=1}^{m} B_t(k)\right]^2\right)}} \quad (7)$$

Other examples of metrics that can be used include the Hellinger metric, the symmetric KL divergence, cosine similarity, etc.

2. Two Dimension Representation and Metric

For the two dimension we compute the normalized cross-correlation, M(x,y) for only the selected pixels and selected mixture components:

$$M_t(x, y) = \frac{\sum_{(x,y) \in R_{x,y}^{C_i}} I_t(x, y) \cdot B_t(x, y) - \frac{1}{w \cdot h} \sum_{(x,y) \in R_{x,y}^{C_i}} I_t(x, y) \cdot \sum_{(x,y) \in R_{x,y}^{C_i}} B_t(x, y)}{\sqrt{\left(\sum_{(x,y) \in R_{x,y}^{C_i}} I_t^2(x, y) - \frac{1}{w \cdot h}\left[\sum_{(x,y) \in R_{x,y}^{C_i}} I_t(x, y)\right]^2\right)\left(\sum_{(x,y) \in R_{x,y}^{C_i}} B_t^2(x, y) - \frac{1}{w \cdot h}\left[\sum_{(x,y) \in R_{x,y}^{C_i}} B_t(x, y)\right]^2\right)}} \quad (8)$$

When M(x,y) is less than a threshold $M_T$, the pixel is labeled as foreground. According to one embodiment, three significant parameters are needed to be set. The threshold of matching ratio $M_T$, the size of the local region $R_{x,y}^{C_i}$ and foreground ratio threshold $P_T$. Based on camera calibration information, the size of the region may vary due to different distance. In one example the parameters were chosen as $M_T$=0.91, $R_{x,y}^{C_i}$={x,y,15,15} and $P_T$=10% The cross-correlation can be efficiently computed using an integral image (e.g., see, reference [9] cited above).

1. Example I

FIG. 1 illustrates a framework of feature level foreground segmentation method and system according to an embodiment of the invention. When an input image 100 is received, the pixel level background model technique 120 is utilized to update the background image 110. Then pixel level subtraction 140 is performed for the entire image 100 with respect to the updated background image 110. Then the foreground density estimation 150 is performed over the entire input image 100. The foreground density estimation 150 defines bounded regions/neighborhoods about each pixel in the input image 100. Then it selects each pixel and checks the aggregate change for that pixel's neighborhood. In this example, the aggregate change is the percentage of the pixels in that pixel's bounded region that have been classified as foreground during the pixel level subtraction 140. That is, a threshold is set in the foreground density estimation 150, indicating the percentage of foreground pixels in the bounded region above which the selected pixel is defined as a foreground pixel.

An indication of the foreground pixels is output by the foreground density estimation 150 to the feature extraction 130, which then provides the pixels of the bounded region of the foreground pixel and the corresponding pixels from the background image 110 to the feature level subtraction 160. The feature level subtraction 160 performs normalized cross correlation for the pixels of each bounded region received from the feature extraction 130. Alternatively, the indication of the foreground pixels may be output by the foreground density estimation 150 to the feature level subtraction 160. In this case, the feature extraction 130 provides all of the pixels to the feature level subtraction 160, which then performs the normalized cross correlation only for the pixels of each bounded region received from the foreground density estimation 150.

The pixels that are confirmed as foreground pixels during the cross correlation process at the feature level subtraction 160 are used together to generate the output image forming the extracted feature image and defined as the foreground image 180. As shown in FIG. 1, optionally a morphological filter 170 is applied to the output of the feature level subtraction 160. The morphological filter 170 generally performs estimation of missing pixels so as to provide a complete and smoothed foreground image, i.e., a feature extracted image.

The described embodiment has been tested using multiple cameras indoor video surveillance system, and the detection results were used for object tracking and multiple camera hand off. FIGS. 2(A)-(E) illustrate some examples of using the method according to the embodiment described for foreground segmentation under various illumination conditions, in comparison to results obtained using the prior art method. In FIGS. 2(A)-(E), column (a) shows the input image and detected bounding box; column (b) shows the foreground regions of Mixture Gaussian Model, as obtained using the method according to the prior art; column (c) is the foreground region of the embodiment of the invention; and column (d) shows the segmented foreground image. As can be seen by comparing the asks of columns b and c, the masks of column c have more pixels relating to the feature as compared to the mask of column b. Conversely, the mask of column c contains less "noise" or "false foreground" pixels as compared to column b.

Using one embodiment of the invention, video taken from four cameras was processed simultaneously using the inventive method operating in a single Pentium IV computer, providing processing at 7 fps for each camera with image size of 320×240. This embodiment demonstrates that the inventive method is fast and robust for foreground segmentation even under difficult conditions, such as shadows, similar color and illumination changes.

2. Example II

Figure 4:
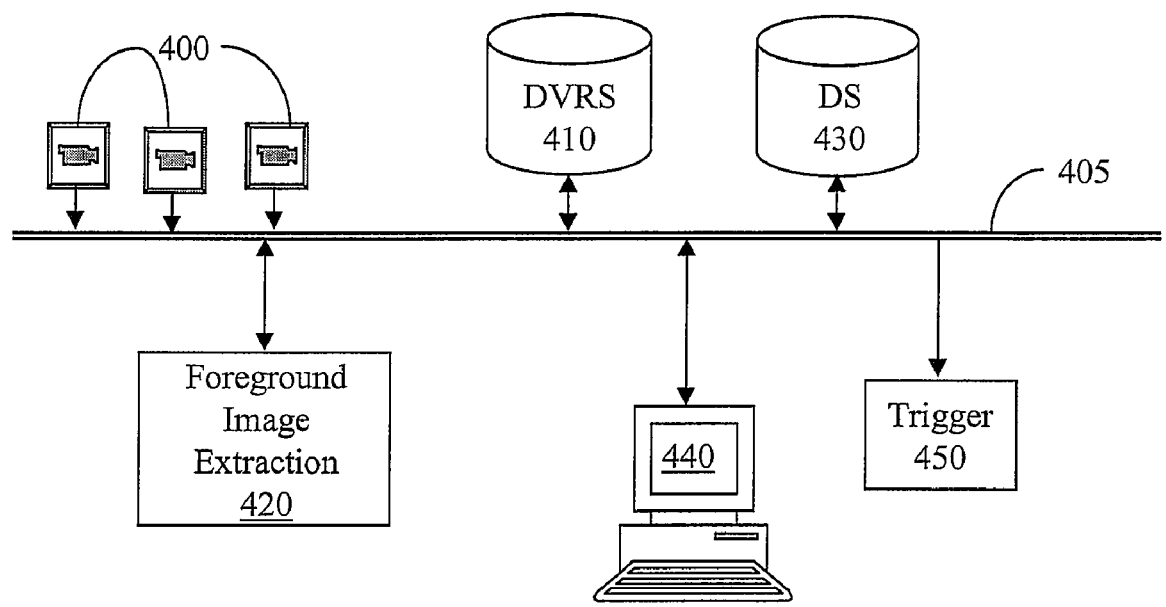
FIG. 4 depicts an embodiment of a system according to the subject invention.

FIG. 4 depicts an embodiment of a system according to the subject invention. In the system of FIG. 4, one or more cameras 400 are connected to a network 405, such as a local area network (LAN). The connection may be by any conventional means, such as wired, wireless, etc., and each camera 400 may have its own identification designation, such as an IP address. The video streams from each camera 400 are stored in a digital video recorder server, DVRS 410. The foreground image extraction module 420 receives frames from the DVRS 410, performs foreground image extraction according to any of the novel methods described above, and outputs the extracted foreground image to the database server 430. The foreground image extraction module 420 may be a specifically programmed general purpose PC or any specially designed processor performing the processing described herein. Alternatively, the foreground image extraction module 420 may be part of the DVRS 410 server or the database server 430. Similarly, the DVRS 410 and the database server 430 may be the same physical machine or separate machines. Further, a human computer interface HCI 440 is provided to enable users to investigate the images on the database server 430. The feature segmented image output by the foreground image extraction 420 may be displayed on the HCI 440. When the foreground image extraction module 420 is implemented as part of the DVRS 410 server or the database server 430, the HCI 440 may also be used to control the foreground image extraction module 420. Optionally, the system also includes a trigger mechanism 450. For example, when the system is used for security purposes, the trigger mechanism 450 may activate an alarm when the foreground image indicates a motion of a potential intruder.

3. Advantages and Benefits

Figure 3:
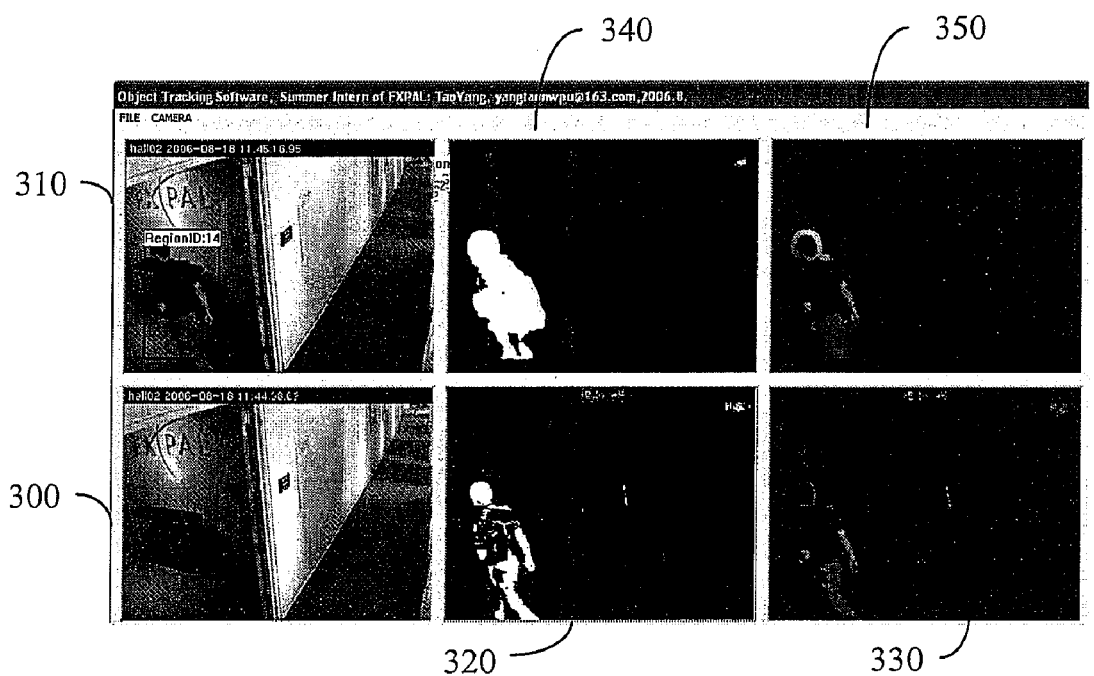
FIG. 3 depicts images captured and processed to obtain a foreground image.

As can be understood from the preceding description, most of the prior art foreground segmentation algorithms are based on pixel level analysis. These prior art methods only compare the difference between pixels, thus ignoring the local region information. That is, the basic prior art processing framework contains two step: (1) using pixel to pixel subtraction to get a rough foreground image, and (2) using a post processing model to remove false alarm pixels of detected foreground regions. Consequently, pixels that were erroneously classified as background if the first step cannot be recovered in the second step. As a result, much information may be missing from the final foreground image. This is illustrated in FIG. 3. FIG. 3 depicts images captured and processed to obtain a foreground image. Image 300 is the background image, while image 310 is the input image. Image 320 results from the pixel to pixel subtraction processing according to the prior art. As can be seen, many pixels were erroneously classified as background, likely because the person's dark shirt appears as shadow or its color was similar to the background color, so that these pixels were removed. Consequently, when the cross correlation is applied based on this result, pixels can only be removed from this result as being misidentified as foreground. However, pixels that were misidentified as background cannot be recovered. Therefore, the resulting foreground image is incomplete, as shown by image 330.

On the other hand, the subject invention uses the local region information, which is more stable than the intensity of a single pixel under shadow or illumination changes. That is, according to embodiments of the subject invention, a neighborhood of pixels is defined for each pixel in the input image 310. Then for each pixel in the input image 310 it is determined what percentage of the neighborhood pixels were classified as foreground pixels. If the percentage is above a threshold, that pixel is designated as foreground pixel. In this manner, pixels that were misclassified as background pixels during the pixel to pixel subtraction can be recovered. Conversely, pixels that were misclassified as foreground pixels during the pixel to pixel subtraction may be removed. The result is a foreground mask, as shown in image 340 in FIG. 3. This process is superior to the prior art method in that it enables overcoming foreground detection issues associated with the prior art methods, such as shadows, lighting changes, similar colors in background and foreground, rapid motion of elements in the background (such as leaves on trees), etc. Then, when the foreground mask is completed, it is applied to the image to select the proper foreground pixels, as identified in the mask 340, to provide the final image 350, which is the feature segments image.

Various embodiments of the invention, e.g., as described with respect to FIG. 1, can be implemented as software executing on a programmed general purpose computer, a special purpose computer, a microprocessor or the like. It should also be understood that each element shown in FIG. 1 may be implemented as a circuit, routine, and/or application, i.e., as a module implemented in hardware, software or combination of hardware and software, and as a portion of a suitably programmed general-purpose data processor. Alternatively, each of the circuits, routines, and/or applications shown in FIG. 1 can be implemented as physically distinct hardware circuits within an ASIC, a digital signal processor (DSP), a FPGA, a PLD, a PLA and/or a PAL, or discrete logic elements or discrete circuit elements. In general, any device capable of implementing a finite state machine, that is in turn capable of implementing the framework shown in FIG. 1, can be used to implement the foreground segmentation according to the embodiments of the invention. The particular form of the circuits, routines, applications, and/or objects shown in FIG. 1 will take is a design choice and will be obvious and predictable to those skilled in the art. It should be appreciated that the circuits, routines, applications, and/or objects shown in FIG. 1 do not need to be of the same design.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The invention claimed is:

1. A method for performing feature level segmentation, comprising:
   a. selecting a background image;
   b. selecting an input image;
   c. for each input pixel of the input image:
      c.i. classifying the pixel as a candidate foreground pixel or candidate background pixel;
      c.ii. selecting a neighborhood image about the pixel;
      c.iii. determining the aggregate change in the neighborhood image;
      c.iv. depending upon the aggregate change, reclassifying the pixel as a foreground or a background pixel;

d. outputting an indication of all of the image pixels reclassified as foreground pixels;

wherein determining the aggregate change in step c.iii. comprises calculating the total intensity of pixels in the neighborhood image that were classified as candidate foreground pixels in step c.i.

2. The method of claim 1, further comprising the steps:
e. for each pixel reclassified as foreground pixel:
  e.i. computing a difference of the neighborhood image of the reclassified foreground pixel and the corresponding background neighborhood image; and,
  e.ii. when the difference passes a set threshold, outputting an indication that the pixel is a confirmed foreground pixel.

3. The method of claim 2, further comprising the step:
e.iii. generating a feature extracted image from all of the confirmed foreground pixels.

4. The method of claim 1, further comprising the step:
e.iii. generating a feature extracted image from all of the input pixels that were reclassified as foreground pixels.

5. The method of claim 1, wherein determining the aggregate change in step c.iii. comprises counting the total number of pixels in the neighborhood image that were classified as candidate foreground pixels in step c.i.

6. The method of claim 5, wherein determining the aggregate change in step c.iii. further comprises comparing the total number to a threshold.

7. The method of claim 1, wherein determining the aggregate change in step c.iii. comprises calculating the percentage of pixels in the neighborhood image that were classified as candidate foreground pixels in step c.i.

8. The method of claim 7, wherein determining the aggregate change in step c.iii. further comprises comparing the percentage to a threshold.

9. The method of claim 1, wherein determining the aggregate change in step c.iii. further comprises subtracting the total intensity from a total background intensity of corresponding background neighborhood pixels to generate intensity difference, and comparing an absolute of the intensity difference to a threshold.

10. The method of claim 2, wherein said computing a difference of step
e.i. comprises computing normalized cross correlation for the neighborhood image and the background neighborhood image.

11. The method of claim 10, wherein the cross-correlation is computed using an integral image.

12. The method of claim 2, wherein said computing a difference of step e.i. comprises constructing neighborhood image intensity matrix and background neighborhood image intensity matrix and performing a dot product of the neighborhood image intensity matrix and the background neighborhood image intensity matrix.

13. The method of claim 2, wherein said computing a difference of step e.i. comprises constructing neighborhood image gradient distribution and background neighborhood gradient distribution and computing the similarities of the neighborhood image gradient distribution and the background neighborhood image gradient distribution.

14. The method of claim 1, wherein step c.i. comprises comparing the input pixel to corresponding background pixel in the background image to classify the pixel as a candidate foreground pixel or candidate background pixel.

15. The method of claim 1, wherein step c.ii. comprises selecting a plurality of pixels about the pixel to define the neighborhood.

16. The method of claim 1, further comprising step b.i. updating the background image using the input image
wherein the modules of the system are embodied by one or more processors programmed to perform the required functions.

17. The method of claim 1, wherein step c.iv. comprises comparing the aggregate change to a threshold.

18. A system for performing feature level segmentation, comprising:
a processor;
a video storage module receiving at least one stream of video from at east one video camera;
a feature segmented storage module storing feature segmented images;
a feature extraction module, said feature extraction module comprising:
a background image storage module storing a background image;
a pixel level subtraction module receiving images of the video stream and for each image classifying each pixel of the image as background or foreground pixel;
a foreground density estimation module receiving the background and foreground pixels from the pixel level subtraction module and for each pixel selecting a plurality of neighboring pixels to define a neighborhood image and calculating a total change of the neighborhood, based upon the total change said foreground density estimation module reclassifies each pixel as reclassified-background or reclassified-foreground pixel;
a feature extraction module receiving the reclassified-foreground pixels and generating feature segmented images and output the feature segmented images to be stored in the feature extraction module;
wherein calculating the total change in the neighborhood further comprises calculating the total intensity of pixels in the neighborhood image that were classified as foreground pixels.

19. The system of claim 18, wherein the feature extraction module comprises a feature level subtraction module receiving the reclassified-foreground pixels and performing a normalized cross correlation on a neighborhood of each the reclassified-foreground pixel to select pixels for generating the feature extracted images.

20. The system of claim 19, further comprising pixel level background modeling module receiving the video stream and updating the background image.

* * * * *